Sept. 20, 1949.  V. V. SCARINGELLA  2,482,558
PIPE JOINT
Filed Oct. 26, 1946

Inventor
Vito V. Scaringella
Attorney

Patented Sept. 20, 1949

2,482,558

UNITED STATES PATENT OFFICE 2,482,558

PIPE JOINT

Vito V. Scaringella, Woodlynne, N. J.

Application October 26, 1946, Serial No. 705,973

4 Claims. (Cl. 285—211)

This invention relates to sheet metal pipe structures, and more particularly to a sectional pipe construction especially useful in forming pipe elbows and the like.

Sheet metal pipes for use with furnaces, heating systems, air conditioning systems, and the like are well known. In general, such pipes are constructed of tubular sections which are rolled out of sheet metal and have their overlapping, longitudinal edges riveted or otherwise permanently secured together, thus presenting so-called "solid" pipe sections. These sections may be straight or of segmental form, the latter being used to form elbows or the like. In any case, such "solid" sections are exceedingly bulky and require considerable space for storage when they are stocked or during shipment. Since these sections are hollow, it is apparent that much of the space occupied by them during storage is wasted.

The primary object of my present invention is to provide an improved pipe structure which will not be subject to the aforementioned disadvantage.

More particularly, it is an object of my present invention to provide an improved, sectional pipe structure the sections of which can be either set up to provide continuous pipes or stacked in compact, nested relation to occupy a minimum of space for storage and shipment.

Another object of my invention is to provide an improved, sectional pipe structure the sections of which can be either assembled or separated with great ease.

Still another object of my invention is to provide an improved pipe structure as aforesaid the sections of which can be assembled to provide either straight pipes or curved pipes such as elbows.

A further object of my invention is to provide an improved pipe structure as aforesaid the sections of which can be locked together firmly and without danger of coming apart accidentally.

Still a further object of my present invention is to provide a novel latching device for connecting and releasably locking together pipe sections as above set forth.

It is also an object of my invention to provide an improved pipe structure of the type indicated above which is economical in cost, which can be set up quickly and accurately even by one not familiar with pipe constructions, and which is highly efficient in use.

Figure 2:
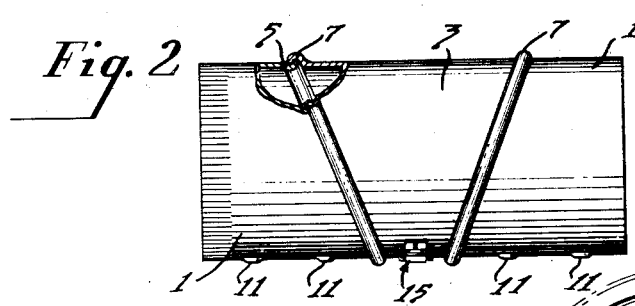
Figure 3:
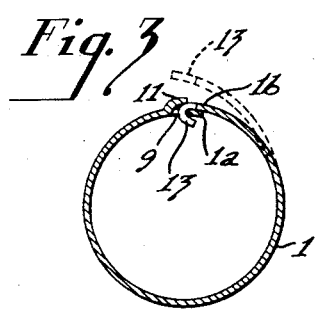

The novel features that I consider characteristic of my invention are set forth with particularity in the appended claims. The invention itself, however, both as to its organization and method of assembly, as well as additional objects and advantages thereof, will best be understood from the following description of one embodiment thereof, when read in connection with the accompanying drawing, in which Figure 1 is a side elevation of a pipe structure according to one form of my invention and embodying three pipe sections assembled to provide a curved pipe or elbow, Figure 2 is a similar view but showing the same three pipe sections assembled to provide a straight pipe, Figure 3 is a sectional view taken on the line III—III of Figure 1 and showing, in dotted lines, one end of one of the pipe sections separated from its other end, Figure 4 is a perspective view showing the middle and locking pipe section of Figures 1 and 2 with its clamping latch open, and also showing, in dotted lines, the manner in which another of the pipe sections may be nested therewithin for compact storage, and Figure 5 is a fragmentary view of the pipe section shown in solid lines in Figure 4 with the clamping latch closed to hold the marginal edge portions longitudinally of this section in overlapped and closed relation.

Figure 1:
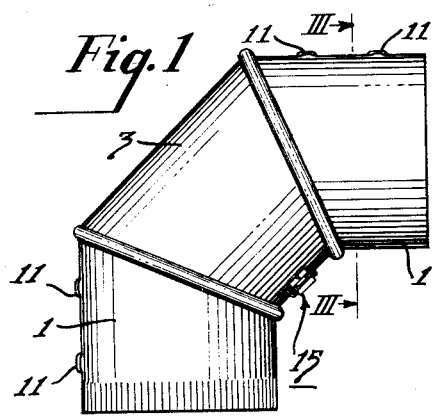

Referring more particularly to the drawing in which similar reference characters designate corresponding parts throughout, there is shown, in Figure 1, a pipe consisting of two end sections 1 and a middle section 3 all rolled out of sheet metal and assembled to provide an elbow. The sections 1 are provided with inwardly directed beads 5 and the section 3 with outwardly directed beads 7 which mate with the beads 5 to interlock the several pipe sections into a unitary, continuous pipe structure when the sections 1 and 3 are assembled in a manner to be more fully set forth hereinafter. Each of the sections 1 and 3 is rotatable on the other and each is of segmental shape or form so that, when they are assembled in the relation shown in Figure 1, they provide an elbow pipe structure, and when the end sections 1 are rotated 180° relative to the section 3 and the three sections are assembled as in Figure 2, they provide a straight pipe structure.

By reason of the segmental shapes of the pipe sections 1 and 3, each of them has diametrically opposed short and long sides longitudinally thereof (that is, in a direction parallel to its axis). The sections 1 are split longitudinally along their said long sides to provide relatively long ends 1a and 1b. Adjacent their ends 1a, the sections 1 are formed with one or more slots 9 by forcing portions 11 thereof outwardly as best shown in Figure 3. The ends 1b of the sections 1 are provided with a like number of tab extensions 13 which are adapted to fit into the slots 9. When the tabs 13 are inserted into the slots 9 and are bent back inwardly, as shown in solid lines in Figure 3, the flexible sections 1 are contracted and the marginal portions adjacent their respective ends 1a and 1b are connected in overlapping relation to complete the tubular sections 1. On the other hand, by simply bending the tabs 13 forwardly and withdrawing them from the slots 9, the ends 1a and 1b become separated and the sections 1 are then expanded and open, as indicated by the dotted lines of Figure 3.

Figure 4:
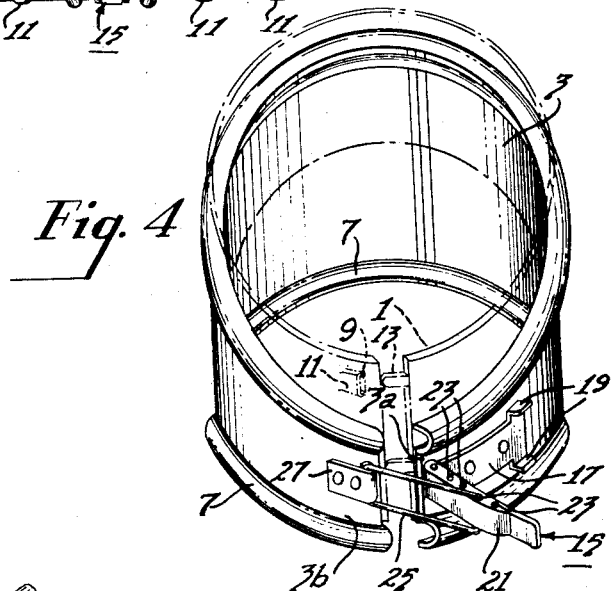
Figure 5:
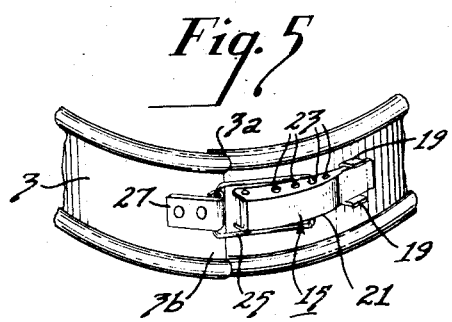

The middle section 3, in contrast to the end sections 1, is split longitudinally along its aforesaid short side, as seen from Figure 4, to provide relatively short ends 3a and 3b. A clamping latch 15 carried by the section 3 adjacent its ends 3a and 3b may be manipulated either to expand and open the flexible section 3 by forcing its ends 3a and 3b apart, as in Figure 4, or to contract the section 3 by bringing the longitudinal marginal portions of the section 3 adjacent to its edges 3a and 3b into overlapping relation and to lock them in the latter relation, as seen in Figure 5. When the section 3 is thus locked in contracted condition around the sections 1, the three sections become interlocked into a continuous pipe structure. However, they can be easily separated by merely unlatching the latch 15.

The latch 15 includes a plate 17 which may be riveted or otherwise suitably secured to the end 3a and which is formed with a pair of upstanding, resilient ears 19. Pivotally carried by the plate 17 is a link 21 provided with a plurality of openings 23 for loosely receiving therein the inwardly directed ends of a U-shaped bail link 25 of resilient material. Thus, the link 25 is pivotally connected to the link 21. A second plate 27 which is secured to the end 3b by rivets or the like pivotally carries the bail link 25. In this way, the ends 3a and 3b are coupled to each other. The plates 17 and 27 are so located on the ends 3a and 3b that these ends will overlap each other when the link 21 is brought down over the plate 17. By snapping the link down between the resilient ears 19, it will be locked against and will overlap the plate 17. To open the latch, it is merely necessary to withdraw the link from between the ears 19. If the link 21 is then raised away from the plate 17, it will apply a force on the link 25 to push the plate 27 away from the plate 17 and will thus open the pipe section 3. By spreading apart the sides of the resilient bail link 25, its ends may be withdrawn from any aligned pair of the openings 23 and inserted into another pair of said openings. Thus, the link 23 may be adjusted on the link 21 circumferentially of the section 3 to thereby vary the extent of relative movement of the plates 17 and 27 when the link 21 is lowered and raised, and thereby the extent of overlap of the ends 3a and 3b. This is to insure a tight fit of the section 3 on the sections 1.

When the several pipe sections are to be stored, they are all opened as above described and any one of them may be nested within any other one or more of them because, being flexible, they can be contracted to a suitable diameter for nesting within each other when their longitudinal ends are separated. The dotted position of one of the sections 1 within the section 3 in Figure 4 illustrates how the several sections may be stored compactly to occupy no more space than does a single section. When the several sections are to be set up to provide a continuous pipe structure, the sections 1 are first set up by inserting their tabs 13 into the associated slots 9 and bending the tabs back. The two end sections 1 are then brought up alongside the middle section 3 and the latch 15 is closed, care being taken to make sure that the beads 7 will interlock with the beads 5. If the section 3 does not fit tightly around the sections 1, the bail link 25 can be moved along the link 21 into the desired openings 23 to insure a tight fit. Thus, there is assured a firm, continuous pipe structure which can be set up easily in practically no time at all, and which can be just as easily and quickly dismantled and arranged for compact storage.

Although I have shown and described but one embodiment of my invention, it will undoubtedly be apparent that many other forms thereof, as well as variations in the one described above, are possible. Moreover, it should be obvious that as many pipe sections as may be desired can be employed utilizing the improved features of my present invention, it being necessary only that the sections 1 and 3 be alternately arranged. Accordingly, I desire that the form of my invention herein described shall be taken merely as illustrative and in no sense as limiting.

I claim as my invention:

1. A pipe structure comprising a plurality of tubular pipe sections each having relatively long and short diametrically opposed sides, certain of said sections comprising members which are split along their said long sides, said long sides being separably connected in overlapping relation to provide certain of said pipe sections, and at least one other of said sections comprising a member which is split along its said short side, said short side being also separably connected in overlapping relation whereby to provide said one other section, said sections being all separably connected to each other in continuous relation, and said overlapping marginal portions being all separable upon separation of said sections from each other to permit opening of the respective sections for the reception therein of one or more of the other of said sections in nested relation therewith, and clamping means on at least one of said sections operable in a circumferential direction thereon for releasably locking said pipe sections to each other in assembled relation, said clamping means including a pair of elements which are adjustable relative to each other also in said circumferential direction for varying the effectiveness of said clamping means.

2. A clamping member for joining the ends of a flexible pipe section or the like which comprises a pair of plates for connection of each to another one of said ends, a first link pivotally carried by one of said plates in proximity to the other of said plates, a second link pivotally carried by said other plate in proximity to said first plate and also pivotally connected to said first link whereby, when said first link is brought into overlapping relation with said first plate it will exert a force on said second link a draw said second plate toward said first plate and when it is raised from said first plate it will exert an opposite force on said second link to push said second plate away from said first plate, and means on said first plate for releasably latching said first link in overlapping relation therewith.

3. A clamping member according to claim 2 characterized in that said second link is adjustably connected to said first link for adjustment along the length of said first link whereby to vary the extent of movement of said second plate relative to said first plate upon pivotal movement of said first link.

4. A clamping member according to claim 2 characterized in that said latching means comprises a pair of resilient ears on said first plate for engagement with said first link when said first link is brought against said first plate.

VITO V. SCARINGELLA.

REFERENCES CITED

The following references are of record in the file of this patent:

UNITED STATES PATENTS

| Number | Name | Date |
| --- | --- | --- |
| 683,584 | Wimmer | Oct. 1, 1901 |
| 807,496 | Rankin | Dec. 19, 1905 |
| 997,072 | Mares | July 4, 1911 |
| 2,194,162 | Conner | Mar. 19, 1940 |